Dec. 7, 1948.                J. M. LESTER                    2,455,373
              TIME BASE SWEEP AND INTENSIFIER PULSE GENERATOR
                        Filed March 25, 1943
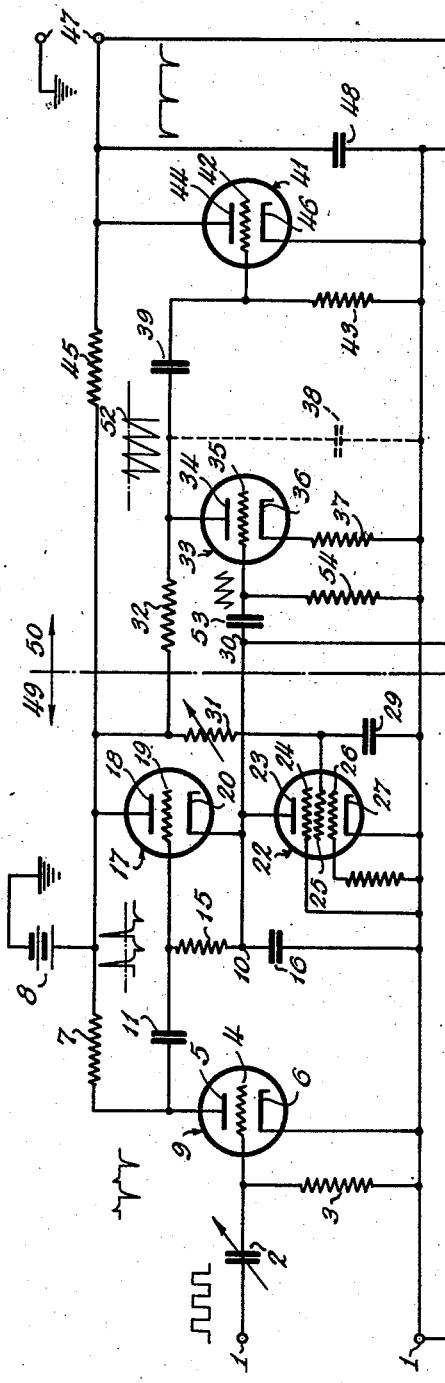
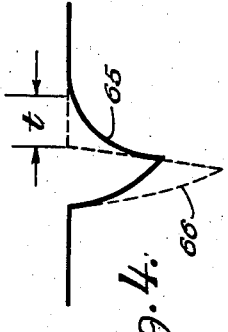
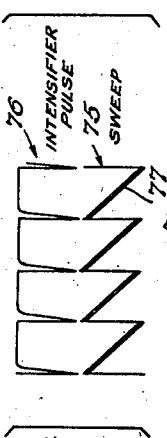
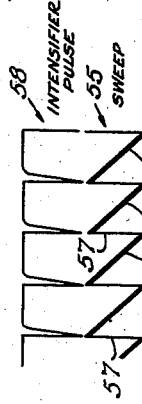
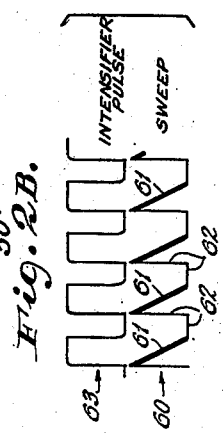
INVENTOR
JOHN M. LESTER
BY
*Paul B. Hunter*
ATTORNEY Patented Dec. 7, 1948

2,455,373

UNITED STATES PATENT OFFICE 2,455,373

TIME BASE SWEEP AND INTENSIFIER PULSE GENERATOR

John M. Lester, Rockville Centre, N. Y., assignor to The Sperry Corporation, a corporation of Delaware Application March 25, 1943, Serial No. 480,570

17 Claims. (Cl. 315—22)

My invention relates to circuits and methods for generating time base sweeps and intensifier pulses as applied to cathode ray tube indication.

In one application of cathode ray tube indication a wave form is projected on the tube screen for analysis as a function of time. Here the spot must "sweep" across the screen at a uniform velocity so that the deflection of the beam at any instant is proportional to the time elapsed since the beginning of the sweep.

To produce this effect, namely that of the sweep, it is necessary to apply to the deflecting plates of the cathode ray tube a voltage that increases linearly with time up to a maximum value and then falls abruptly to datum. For this purpose a voltage having a sawtooth wave form has been found to be satisfactory with certain exceptions, which as concerns the examinations of sinusoidally varying phenomena, may be described as follows.

Since the fall in voltage at the end of the linear rise of the sweep portion of this wave consumes a part of the cycle, the return of the spot or electron beam is not instantaneous, and a section of the wave under study is traced during the return sweep. Although this segment of the pattern, commonly referred to as "retrace" or "flyback," is usually of relatively low brightness, it is highly objectionable, particularly in ultra high frequency applications, where the retrace section of the pattern becomes appreciable.

In a more particular application of cathode ray tube indication, namely, radar range measurement, the problem of retrace or flyback presents itself in a slightly different manner.

Here, the sweep wave may be impressd upon one set of the tube's deflecting plates, and a pulse, reflected from a target, received on the other deflecting plates. For example, the sweep wave may be applied to the horizontal deflecting plates, in which case the tube screen will be graduated horizontally from zero to maximum range, and the reflected signal received on the vertical deflecting plates. With the tube connected thus, the linear portion of the sweep wave will cause the electron beam to sweep from zero to maximum range, and the reflected signal will appear at some point between, indicative of the distance from the target. At the end of the sweep, however, the electron beam is deflected back to zero, due to characteristics of the sweep wave discussed above, and a portion of the signal pattern may be retraced.

Similarly, where the sweep is applied to the horizontal deflecting plates and the reflected signal is received on the grid of the tube, the effect of retrace is likewise present. Here the electron beam is continuously swept from zero to maximum range by the sweep wave, and the reflected signal appears as a spot at some point between to indicate the target range. Since the beam is deflected horizontally by the sweep portion of the sweep wave and returned by its abrupt fall to datum, it is evident that it is impossible for the observer to tell on which portion of the sweep the reflected signal is received, as long as the retrace section of the pattern is present.

In all instances then, it is necessary to eliminate the portion of the projected pattern produced by that part of the sweep wave which consumes any portion of its cycle other than that in which the voltage is increasing or decreasing linearly with time. To effect this elimination, it is common practice to bias the grid of the cathode ray tube beyond cut-off during the return sweep by the application of a pulse voltage synchronized to give bias for only that portion of the sweep cycle during which the voltage is not varying linearly with time.

Many methods have been devised for generating this "intensifier" pulse, among them being the multivibrator circuit, which has been used rather extensively in range measurement indication. In this particular application, however, it is often desirable to change the range indication and at the same time utilize the full scale deflection of the cathode ray tube, which change makes the use of a multivibrator circuit for intensifier pulse generation less practicable.

For example, at a given frequency, the full scale deflection of a tube may be graduated for a range of fifteen miles. It may then be desirable, at the will of the observer, to reduce the range indication to seven and one-half miles for the same full scale deflection, and in such case the form of the sweep wave must necessarily be changed.

This may be illustrated by a description of actual sweep wave forms for the condition stated. To give a range of fifteen miles, the sweep wave may be of the inverted sawtooth form, i. e., having an abrupt rise, lineal decrease with time to datum, abrupt rise, lineal decrease, etc.; while for a range of seven and one-half miles the form would be abrupt rise, lineal decrease with time to datum, horizontal displacement, abrupt rise, lineal decrease, horizontal displacement, etc. Thus, such a decrease in range necessitates a change in the form of the sweep wave which increases its slope and extends the retrace portion of the pattern to include that section of it produced by the segment of the sweep wave described above as horizontal displacement and abrupt rise. To eliminate this retrace, it is readily seen from the above that the grid of the cathode ray tube must be biased by an intensifier pulse having a particular wave form and being synchronized to render ineffectual that part of the sweep described as horizontal displacement and abrupt rise.

To produce such an intensifier pulse with a multivibrator, it is necessary to change the circuit parameters for each change in the sweep wave; and, while this method proves satisfactory from the standpoint of erasing the retrace, it is less practicable in operation.

In the first place, the intensifier pulse is generated in a circuit independently of the sweep, and a change of range indication therefore requires changes in two separate circuits. Secondly, the multivibrator is, without elaborate refinement, unstable, since it needs a synchronizing pulse for its operation and therefore requires repeated adjustment.

Further, with present intensifier pulse generating means it is not possible to change the frequency of the input wave, maintain a fixed sloped sweep wave, and at the same time vary the intensifier pulse to synchronize it with the changed sweep wave. This particular characteristic of present apparatus limits the interchange of equipment where inputs of different frequencies are used.

Accordingly, it is an object of my invention to provide a circuit for generating time base sweeps and intensifier pulses which with a single adjustment for a change in the sweep wave will automatically produce an intensifier pulse, of proper wave form, synchronized to eliminate the retrace of the changed sweep wave.

Another object of my invention is to provide a circuit having a characteristic described in the paragraph next above which will generate a sweep of constant slope irrespective of frequency changes in the input voltage.

It is also an object of my invention to arrange a circuit for generating intensifier pulses which is stable in operation and which does not require repeated adjustments.

Another object of my invention is to provide a circuit of unitary design which will generate a variable sweep wave and an intensifier pulse simultaneously.

Another object of my invention is to provide in a single circuit a variable sweep wave generating branch and an intensifier pulse generating branch so arranged that the output of the former branch will be fed to the latter branch to produce a pulse which will change in form with any variation in the form of the sweep wave.

A further purpose of my invention is to provide a method for generating an intensifier pulse from a sweep wave which it is to intensify, that will automatically maintain synchronism with the sweep as the latter is varied.

In carrying out the objects of my invention, I have arranged in a preferred embodiment thereof, a single circuit comprising a sweep wave generating branch and an intensifier pulse generating branch. A square wave of any desired frequency is impressed upon this circuit where, in the sweep generating branch, it is differentiated, amplified and clipped to form a sawtooth wave across a resistive-capacitive network. A portion of the output of this branch is taken from the circuit for use as a sweep and a portion is also fed to the intensifier pulse generating branch where it is inverted, clipped and amplified to form an intensifier pulse.

A suitable electronic discharge device, acting as a constant current element, is employed as a discharge resistor in the resistive-capacitive network of the final stage of the sweep generating branch. The value of the capacitive discharge current of the network is changed by varying a dropping resistor placed in the screen grid circuit of the constant current element which in turn changes the slope of the sawtooth wave and the width of the intensifier pulse.

Selected values of plate resistance together with the plate capacitance of the inverter stage in the intensifier pulse generating branch provide sufficient delay in the resultant intensifier pulse so that it can be used without further alteration to intensify the sweep portion of the sawtooth wave. This holds true for any form of sweep wave generated, and an intensifier pulse is thus automatically generated which is synchronized with the sweep from which it is obtained.

For a more comprehensive understanding of my invention, reference is made to the following detailed description and the accompanying drawing in which—

Fig. 1 is a circuit diagram of an embodiment of my invention;

Fig. 2A is a graphical representation of a sweep wave and its accompanying intensifier pulse for a given condition of range, as generated by the circuit shown in Fig. 1;

Fig. 2B is a similar representation of the waves shown in Fig. 2A when the range is reduced by one-half;

Fig. 3A is a graphical representation of a sweep wave and its accompanying intensifier pulse as generated by the circuit shown in Fig. 1, for a given frequency;

Fig. 3B is a similar exhibition of the waves shown in Fig. 3A at half of the given frequency; and Fig. 4 is an enlarged view of one pulse taken from the circuit at 47, Fig. 1, showing the effect of integration in the intensifier pulse generating branch.

In the circuit illustrated in Fig. 1, the sweep wave generating branch 49 comprises the tubes 9, 17, and 22, and the intensifier pulse generating branch 50, the tubes 33 and 41. The wave forms produced at various points within each branch are represented by segments thereof.

In the sweep generating circuit the grid 4 of tube 9, which may be of the triode type, is connected to the input terminal 1, through the differentiating coupling elements 2 and 3. The anode 5 of this tube is connected to positive energy source 8, through the plate resistor 7, and its cathode 6 is connected directly to ground.

The output of tube 9 is fed to the grid 19 of tube 17, illustrated as a triode, through the condenser 11 and the coupling elements 15 and 16. Plate 18 is connected to positive energy source 8 and cathode 20 to terminal point 10 intermediate the resistor 15 and the capacitor 16. A tube 22 is connected in the cathode circuit of tube 17 and acts as a capacitor discharge resistor. The plate 23 of tube 22 and the cathode 20 of tube 17 are tied together; and the cathode 27, control grid 26 (through a resistor), and suppressor 24 of tube 22 are grounded as shown. The screen grid 25 is by-passed to the cathode 27 by capacitor 29 and is connected to source 8 through rheostat 31.

The output of the sweep generating branch is taken from the cathode 20 of tube 17 and delivered to the terminal 30 from which point it is fed to the initial stage 33 of the intensifier pulse generating branch 50, and also transmitted as a sweep wave to a pair of deflecting plates of the oscilloscope 51.

From the terminal 30 the cathode output of tube 17 is received by grid 35 of tube 33 through the coupling elements 53 and 54. Anode 34 of tube 33, the plate capacitance of which is represented by the phantom capacitor 38, is connected to positive source 8 through the plate resistor 32, and cathode 36 of tube 33 is connected to ground through resistor 37. The plate resistor 32 together with the plate capacitance 38 of tube 33 constitutes an integrating circuit, the function of which will be explained later.

The output of tube 33 is in turn fed to the grid 42 of triode 41, which is coupled for grid leak bias, through the capacitor 39 and resistor 43. Anode 44 is maintained positive by the energy source 8 through the plate resistor 45, and the cathode 46 is connected directly to ground. Connected in parallel across the anode and cathode leads of tube 41 is a capacitor 48 which, with resistor 45, further integrates the intensifier pulse.

The output of the intensifier pulse generating branch 50 is taken from the anode 44 of stage 41 at the output terminals 47 for delivery as an intensifier pulse to an electrode of the oscilloscope 51.

The requirements of the above-described circuit with reference to one of its applications and its operation can best be visualized by referring to Figures 2A, 2B, 3A and 3B, where in all instances the useful portion of the sweep wave is emphasized in the illustration as a heavy black line.

Let it be assumed that for a given range indication a sweep wave, such as 55, Fig. 2A, is employed to give full range deflection on the tube screen of a cathode ray tube indicator. Such a wave would necessarily have a sweep portion 56 having a definite slope $$\frac{dv}{dt} = S$$

which must be intensified to prevent the effect of retrace. To do this, the portion 57 of the sweep wave is erased by biasing the grid of the cathode ray tube with an intensifier pulse having the wave form 58.

Now, if the range is to be reduced by one-half and the same full scale deflection used, the time necessary for full sweep must also be reduced by one-half, and the slope of the sweep must be doubled.

To meet these requirements a sweep wave 60, Fig. 2B, is used having a sweep portion 61, the slope of which is equal to 2S. Here again the retrace portion 62 of the wave must be erased, and for this purpose an intensifier pulse having a wave form 63 is used.

If the range is to be reduced to one-fourth, three-fourths, or to any other fraction, changes in the slope of the sweep must be made with accompanying changes in the intensifier pulse which are similar to those illustrated.

In generating the required sweep wave and its accompanying synchronized intensifier pulse for each given condition of range indication, the operation of the circuit diagrammed in Fig. 1 is as follows.

A square wave, impressed upon the input terminals 1 of the circuit, is differentiated by the coupling elements 2 and 3 shown respectively as a variable capacitor and a fixed resistor. The differentiated wave is next fed to the grid 4 of tube 9 in which stage it is clipped and amplified to appear as a positive pulse across the load resistor 7. This pulse is then received by the grid 19 of the electronic discharge device 17 from whose cathode 20 a sawtooth wave, or a modification thereof, is obtained due to the charging action of capacitor 16 and the constant current element 22 which maintains the discharge of the capacitor at a constant rate.

Since the constant current element 22 controls the discharge rate of the current discharge device 16, the slope of the sweep taken from the cathode 20 of element 17 is a function of the plate resistance of element 22. To effect variation in the slope of the sweep, it is therefore necessary to vary the discharge rate and accordingly the plate resistance of element 22.

For this purpose the variable resistor 31 is interposed in the screen grid circuit of element 22 to control the voltage applied to it, and changes in the slope of the sweep taken from terminal 30 are made possible by the following circuit operation.

As the resistance of rheostat 31 is decreased, the screen grid voltage of element 22 is increased with a resultant decrease in the plate resistance thereof. As the plate resistance of element 22 is decreased, the discharge rate of capacitor 16 is increased and the slope of the sweep is in turn increased. Conversely, the slope of the sweep is decreased with an increase in the resistance of rheostat 31.

Since the intensifier pulse must be synchronized with the sweep which it is to intensify, the sweep wave itself is used to generate the pulse.

Thus, the cathode output of element 17 is fed to the grid of the electronic device 33 comprising the first stage of the intensifier pulse generator 50. From the anode 34 of this device, where the sawtooth wave or a modification thereof is inverted, the altered wave is fed to grid 42 of tube 41. Here the coupling elements 39 and 43 are chosen to provide grid leak bias for tube 41 and, accordingly, the inverted wave is clipped and amplified at this stage to deliver at the output terminals 47 and intensifier pulse which is synchronized with the sweep wave from which it is obtained. It is to be noted that the value of bias provided by the grid leak is of such magnitude that only a small tip 52 of the sawtooth's peak is amplified as the intensifier pulse. This portion 52 of the wave is selected because of its proximity to the retrace portion of the sweep wave, thus requiring a minimum amount of delay in the circuit. Bias by grid leak is used, since the value thereof is a function of the amplitude of the input wave and clipping action of the tube is maintained fairly constant.

The operation of elements 33 and 41 need not be treated in detail, since they perform well-known functions with standard operation. The effect of certain parameters within the circuit, however, is of interest.

As stated previously, the load resistor 32 of tube 33 acts with the plate capacitance 38 of that element to provide an integrating stage for the pulse generating branch as does plate resistor 45 in conjunction with capacitor 48 connected across the tube 44. This portion of the circuit is necessary to the successful operation of the circuit, as will now be shown.

In Fig. 4 there is shown an enlargement 65 of one pulse of the output wave form taken from the circuit at terminal 47, Fig. 1. This wave has superposed on it a pulse 66 which would obtain if the integrating elements were not present in the circuit. Comparison of these two pulses clearly shows that the value of the voltage necessary to intensify the indication on the cathode ray tube screen is reached at a time interval $t$ before the same voltage is reached by pulse 65. Translated into terms of effects, this means that when the pulse 66 is used to intensify the sweep taken from terminal 30, intensification occurs prematurely by the time $t$ and a portion of the retrace is intensified as well as the sweep.

Since the sole purpose of the pulse is to erase the retrace, it is evident that the pulse 66 is not suitable and that proper intensifier bias must be delayed until it is in synchronism with the sweep portion of the sweep wave. Such is the function of the integrating elements 32, 38, 45 and 48, which change the shape of pulse 66 to that of pulse 65, their action being to attenuate the high frequency components of the wave and pass the low frequency components.

In the discussion of the circuit operation up to this point, reference has not been made to the effect of input frequency changes, and it has been assumed for the conditions stated that this frequency has been maintained constant.

It is a desirable characteristic of the circuit, particularly in its application to range measurement, that variations in the input frequency have no appreciable effect on its operation. Illustrative of this fact are the output graphs shown in Figs. 3A and 3B. For a given input frequency and a fixed setting of resistor 31, the circuit shown in Fig. 1 may deliver respectively at the output terminals 30 and 47 thereof a sweep wave 75 (Fig. 3A) and its accompanying intensifier pulse 76. If the input frequency is then reduced by one-half, the resultant outputs will approach the respective wave forms 79 and 80, Fig. 3B.

A comparison of the waves 75 and 79 shows that the sweep portion 77 of wave 75 is identical with portion 78 of wave 79 both as to slope and duration. This condition of equivalency is due to the fact that the slope of the sweep generated by the circuit in Fig. 1 is a function of the time rate of discharge of capacitor 16 which is controlled by the constant current element 22. Since the rate of discharge of capacitor 16 is unaffected by frequency variations, it follows that for a fixed setting of the rheostat 31, the sweep characteristics of the wave generated are immune to changes in input frequency. Further, the intensifier pulse as such remains unaffected since it is obtained from the sweep wave.

While a frequency change of one-half is here used for illustration, it is understood that the same condition holds true for all frequency variations within reasonable limits.

Summarizing, a square wave is differentiated, clipped and amplified in branch 49, Fig. 1, to form a sweep which is unaffected by reasonable changes in input frequency. A portion of the output of this branch is then fed to the pulse generating branch 50 where it is inverted, clipped, amplified and integrated to form a pulse which is synchronized to occur in time relation with the retrace portion of the sweep wave from which it is formed. Variations in the characteristics of the sweep are effected by a single adjustment of rheostat 31 which simultaneously effects changes in the phase of the intensifier pulse to synchronize it with the altered sweep.

Modifications of my invention are of course possible and may suggest themselves from the foregoing disclosure. The embodiments herein shown and described are to be considered, therefore, as illustrative only, and the spirit and scope of my invention are to be limited solely by the appended claims.

What is claimed is:

1. In combination, a linear time base sweep generating stage, means for furnishing a differentiated square wave to the input of said sweep generating stage, means for controlling said sweep generating stage to vary the slope of the sweep wave, and an inverter stage and a clipping and amplifying stage connected in cascade to the output of said sweep generating stage to thereby form an intensifier pulse which is synchronized with the output of said sweep generating stage.

2. In a sweep wave generating circuit, a time base sweep generating stage having a constant current control device, an inverter stage for receiving the output of said sweep generating stage, and a clipping and amplifying stage coupled to said sweep generating stage by means of a delay circuit.

3. In a sweep wave generating circuit, a time base sweep generating stage having a constant current control device, and an inverter stage for receiving a part of the output of said sweep generating stage to produce an intensifier pulse, said inverter stage including means for delaying the occurrence of the effective portion of said intensifier pulse with respect to time.

4. In a variable sweep wave generating circuit, a sweep wave generator and an inverter stage coupled thereto for producing an intensifier pulse, said inverter stage including means for delaying the occurrence of the effective portion of said intensifier pulse with respect to time.

5. In combination, a linear time base generating circuit, an intensified pulse generating and delaying circuit, means interconnecting said linear time base generating circuit and said intensifier pulse generating circuit, and means for changing the wave form of the linear time base, said last-mentioned means being operable through said interconnecting means to produce an accompanying synchronizing change in the intensifier pulse wave form.

6. In a combination sweep wave and intensifier pulse generating circuit, a differentiating input coupling, a linear time base generating stage, an inverter stage including a delay circuit, output connections interposed between said linear time base generating circuit and said inverter stage for delivering a sweep wave, a clipping and amplifying stage for receiving the output of said inverter stage, and output connections for delivering an intensifier pulse wave.

7. In a linear time base generating circuit, means for generating and delaying a sweep wave, means for generating an intensifier pulse, and means for interconnecting said sweep wave generating circuit and said intensifier pulse generating circuit whereby a change of slope in the sweep wave effected by a change in the constants of said sweep generating circuit automatically effects an accompanying change in the wave form of the intensifier pulse to thereby synchronize it with the altered sweep wave.

8. In combination, a cathode ray tube indicating device, a wave generating circuit comprising a sweep wave generating branch and an intensifier pulse generating and delaying branch for generating a sweep wave and an intensifier pulse, means for varying the wave form output of said sweep wave generating branch, and means interconnecting said sweep wave generating branch and said intensifier pulse generating branch whereby a change in the wave form output of the sweep wave generating branch automatically produces a corresponding change in the intensifier pulse wave form which automatically synchronizes said intensifier pulse with the altered sweep wave.

9. In combination, a circuit comprising a sweep wave generating branch and an intensifier pulse generating branch, said sweep wave generating branch comprising differentiating means, means for clipping and amplifying the output of said differentiating means, a current discharge device and means for controlling the discharge of said current discharge device to deliver a time base sweep of variable slope; and said intensifier pulse generating branch comprising inverting means, clipping and amplifying means, and integrating means, said inverting, clipping, and amplifying, and integrating means being operable to produce a pulse synchronized in time relationship with the sweep wave output of said sweep wave generating branch.

10. The method of generating an intensifier pulse, comprising the steps of differentiating, clipping and amplifying a square wave to produce a sawtooth wave, inverting said sawtooth wave, and clipping, amplifying, and integrating the same.

11. The method of simultaneously generating a variable sweep wave and an accompanying synchronized intensifier pulse, comprising the steps of differentiating, clipping and amplifying a square wave to produce a sawtooth wave, inverting said sawtooth wave, and clipping, amplifying and integrating the same.

12. The method of generating an intensifier pulse from a sweep wave portions of which it is intended to intensify, comprising the steps of inverting, clipping and amplifying said sweep wave, and integrating the same.

13. The method of producing a variable sweep, comprising the steps of differentiating, clipping and amplifying a square wave to generate a pulse, storing the energy of said pulse, discharging the same, and controlling the time rate of discharge.

14. A method of generating an intensifier pulse from a sweep wave which it is intended to intensify comprising the steps of inverting the sweep wave, clipping the same, and delaying the occurrence of the effective portion of said intensifier pulse with respect to time.

15. A method of operating an oscilloscope which comprises the steps of supplying a sweep wave to a pair of deflecting plates thereof, inverting and delaying the sweep wave to form an intensifier pulse, and applying the intensifier pulse to the oscilloscope.

16. An intensifier pulse generator comprising an inversion stage with input connection for receiving a sweep wave to be intensified, and delay means for delaying the occurrence of the effective portion of said intensifier pulse with respect to time.

17. A method of operating an oscilloscope which comprises the steps of supplying a sweep wave to a pair of deflecting plates thereof, deriving an intensifier pulse from the sweep wave after delay thereof, and applying the intensifier pulse to an electrode of said oscilloscope.

JOHN M. LESTER.

REFERENCES CITED

The following references are of record in the file of this patent:

UNITED STATES PATENTS

| Number | Name | Date |
| --- | --- | --- |
| 1,933,219 | Nakajima et al. | Oct. 31, 1933 |
| 2,052,183 | Lewis et al. | Aug. 25, 1936 |
| 2,059,004 | Leeds | Oct. 27, 1936 |
| 2,078,644 | Swedlund | Apr. 27, 1937 |
| 2,114,938 | Puckle | Apr. 19, 1938 |
| 2,126,243 | Busse et al. | Aug. 9, 1938 |
| 2,230,926 | Bingley | Feb. 4, 1941 |
| 2,241,256 | Gould | May 6, 1941 |
| 2,284,714 | Bedford | June 2, 1942 |
| 2,303,924 | Faudell | Dec. 1, 1942 |
| 2,313,967 | Read, Jr. | Mar. 16, 1943 |
| 2,355,363 | Christaldi | Aug. 8, 1944 |
| 2,405,238 | Seeley | Aug. 6, 1946 |

FOREIGN PATENTS

| Number | Country | Date |
| --- | --- | --- |
| 459,041 | Great Britain | Dec. 28, 1936 |

Certificate of Correction

Patent No. 2,455,373.  December 7, 1948.

JOHN M. LESTER

It is hereby certified that errors appear in the printed specification of the above numbered patent requiring correction as follows:

Column 8, line 44, claim 5, for the word "intensified" read *intensifier*; line 64, claim 7, strike out "and delaying" and insert the same after "generating" in line 65, same claim;

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*